March 20, 1928.                    M. H. HERLICK                    1,663,405
BOTTLE TOP
Filed Dec. 31, 1926
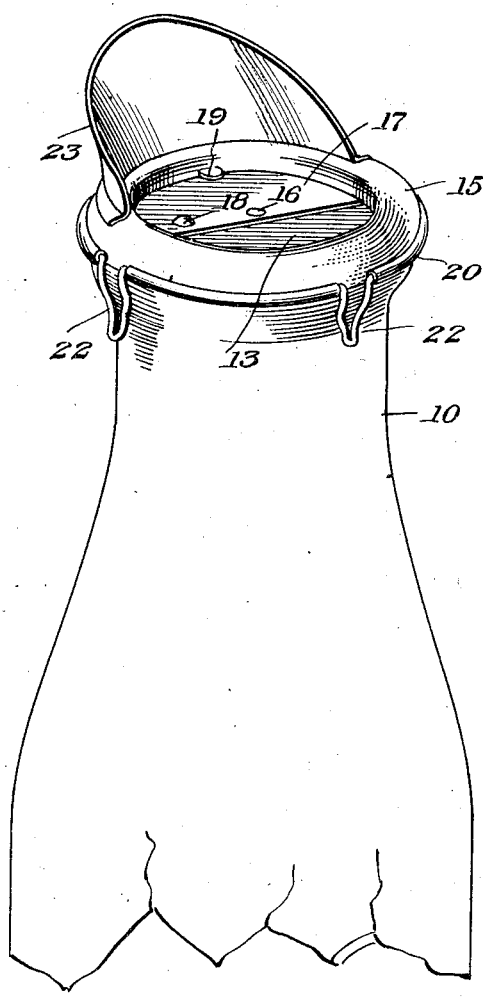
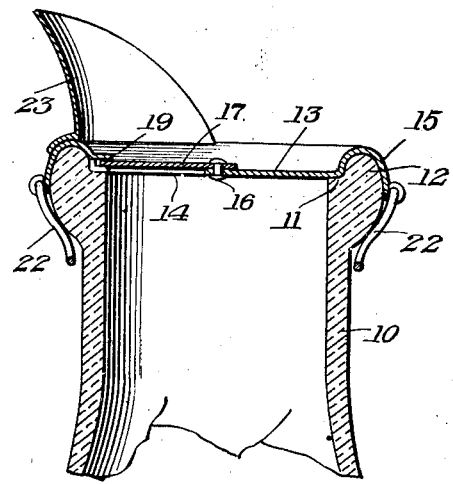
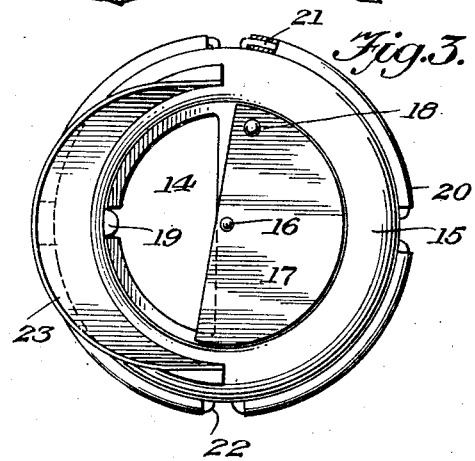
Martin H. Herlick
INVENTOR
BY Victor J. Evans
ATTORNEY Patented Mar. 20, 1928.

1,663,405

UNITED STATES PATENT OFFICE.

MARTIN H. HERLICK, OF LONG BEACH, CALIFORNIA.

BOTTLE TOP.

Application filed December 31, 1926. Serial No. 158,359.

This invention relates to closures for containers and has for an object the provision of a combined closure and pouring spout which is especially adapted for use upon milk bottles, jars or similar containers.

Another object of the invention is the provision of a device as above stated, which will securely close the mouth of a bottle or the like and protect the contents from flies and other insects, as well as from contact with the mouth of the bottle, and which in addition, will permit the contents to be poured from the bottle without danger of spilling.

Another object of the invention is the provision of novel means for removably attaching the device, so that the latter may be conveniently and securely attached to or removed from a bottle.

A further object of the invention is the provision of a closure which may be mounted upon a bottle by means of a protecting shield and the latter utilized to mount a pouring spout and thus provide a unitary article capable of being quickly secured to or removed from a bottle.

With the above and other objects in view, the invention further includes the following novel features and details of construction, to be hereinafter more fully described, illustrated in the accompanying drawings and pointed out in the appended claims.

In the drawings:—

Figure 1 is a perspective view illustrating the invention attached to a milk bottle.

Figure 2 is a sectional view of the same.

Figure 3 is a top plan view.

Referring to the drawings in detail wherein like characters of reference denote corresponding parts, the reference character 10 indicates the neck of the milk bottle, of the usual construction, wherein the mouth is surrounded by a shoulder or seat 11 and a bead 12.

The invention comprises a disk 13 which is designed to be positioned upon the shoulder 11 and which is provided with an opening 14 through which the contents of the bottle may be poured. The disk 13 is surrounded by a transversely channel-shaped annular shield 15 which engages over the bead 12 in such manner as to prevent the contents of the bottle from contacting with the bead when poured from the bottle. This protects the contents against the unsanitary condition of the bead.

Pivotally mounted upon the disk 13 as shown at 16 is a disk-like closure 17, the latter being of a shape and size to close the opening 14. The closure 17 is provided with a lid 18 having a knob for convenience of manipulation. Extending inwardly and preferably struck from the shield 15 is a lip 19 which is spaced slightly above the disk 13 and is adapted to receive under it the closure 17. The lip is so positioned as to frictionally engage the closure 17 and hold the latter against accidental opening.

The outer edge of the shield 15 is rolled as at 20 and this rolled edge encloses a wire 21. The rolled edge 20 is interrupted as shown and the wire 21 is shaped at these interrupted portions to provide fingers 22 which engage downwardly beneath the bead 12. As the sections of the wire between these fingers are curved and are tightly held in position by the rolled edge 20, the fingers 21 will have a spring action which will permit them to be readily slipped over or removed from the bead.

Mounted upon the shield 15 is a spout 23, by means of which the contents of the bottle may be conveniently poured.

It will be apparent from the foregoing description and accompanying drawings that the invention provides a convenient and sanitary container for table use, or for picnics, in that the contents need not be disturbed until ready for immediate use. It may be used in the place of the usual pitcher and thus eliminates the necessity of pouring the contents of the bottle into another container. The invention is preferably made of aluminum or some other attractive and non-corrosive material.

The invention is susceptible of various changes in its form, proportions and minor details of construction and the right is herein reserved to make such changes as properly fall within the scope of the appended claims.

Having described the invention what is claimed is:—

1. A container closure comprising in combination with a container having an opening and a bead surrounding the opening, a disk adapted to fit within said opening, said disk also having an opening therein, a pivoted closure secured upon the top of the disk, means associated with the disk and engaging the bead to hold the disk in place, and a lip positioned above the disk for frictional engagement by the pivoted closure to hold the latter in position.

2. A container closure comprising in combination with a container having an opening and a bead surrounding the opening, a disk adapted to fit within said opening, said disk also having an opening therein, a pivoted closure secured upon the top of the disk, an annular transversely channel-shaped shield extending around the disk and engageable over the bead, and means carried by the shield for engagement by the pivoted closure to hold the latter in position.

3. A container closure comprising in combination with a container having an opening and a bead surrounding the opening, a disk adapted to fit within said opening, said disk also having an opening therein, a pivoted closure secured upon the top of the disk, an annular transversely channel-shaped shield extending around the disk and engageable over the bead, means carried by the shield for engagement by the pivoted closure to hold the latter in position, a wire secured over the edge of the shield, and downwardly extending yieldable loop-shaped fingers included in the wire to hold the closure on the bottle and a spout carried by the shield.

In testimony whereof I affix my signature.

MARTIN H. HERLICK.